Nov. 27, 1956 J. J. KAMP ET AL 2,771,771
DETECTOR FOR AN INDUCTION LIQUID FLOW METER
Filed July 17, 1952 2 Sheets-Sheet 1

INVENTORS
Johannes Jacobus Kamp
Jacobus Laurens Smals
BY
Curtis Morris & Safford
ATTORNEYS United States Patent Office 2,771,771
Patented Nov. 27, 1956

2,771,771

DETECTOR FOR AN INDUCTION LIQUID FLOW METER

Johannes Jacobus Kamp and Jacobus Laurens Smals, Amsterdam, Netherlands, assignors to Technisch Ontwikkelingsbureau voor Instrumentatie, (T. O. B. I.) N. V., Amsterdam, Netherlands Application July 17, 1952, Serial No. 299,518

1 Claim. (Cl. 73—194)

The invention relates to a detector for an induction liquid flow meter especially for detectors for larger tube diameters. The operation of said meters is based on the Induction Law of Faraday and has been circumstantially described in literature.

The most important sources are:

M. Faraday Phil. Trans. p. 125, 1832; M. Faraday Exp. Res. in Electricity, vol. 1, p. 55, 1839.

The induction of electromotive forces in a moving fluid by a magnetic field and its investigation of the flow of fluids by E. J. Williams Ph. D., Proceedings of the Physical Society of London, p. 466–478.

Methode zur elektrischen Geschwindigkeitsmessung von Flüssigkeiten von B. Thürlemann. Helvetia Physica Acta 13–6–41, 14, No. 5/6, pp. 383–419.

An alternating field induction flowmeter of high sensitivity by A. Kolin, Rev. of Scientific Instruments, vol. 16, No. 5, May 1945.

An induction flow meter design for radioactive liquids, W. J. James, Rev. of Scientific Instruments, vol. 22, No. 12, 1951.

An electronic flow meter and its industrial application by E. Mittelman, V. J. Cushing, National Convention I. R. E., 1950, New York.

Detectors for induction liquid flow meters consist of the following components:

1. A circular tube for the liquid to be measured.
2. A homogeneous magnetic field perpendicular to said tube.
3. A pair of electrodes in the middle of the tube-wall situated on a line perpendicular to the tube and the magnetic field.

As soon as an electrically conducting liquid flows through the tube an electrical potential is generated between the electrodes, said potential being proportional to the quantity of liquid which flows through, that is, to the velocity of the liquid in the tube. Said voltage in most cases is usually of the order of some millivolts so that amplification is necessary. As magnets, permanent magnets or electromagnets can be used. In using permanent or D. C. energized magnets a D. C. signal occurs at the electrodes, the magnitude of which being proportional to the velocity of the liquid, the polarity of the signals changing with the direction of flow. As spurious signals, contact potentials in the measuring circuit and polarization of the electrodes can occur. The first mentioned disturbance can be kept constant. The second disturbance can be decreased by using nonpolarizable electrodes. The amplification of the signals is hampered by the inconstantness of the zero-level of a D. C. amplifier.

By using an A. C. electromagnet the signal which occurs will be an A. C. signal. The magnitude of said signal is proportional to the liquid velocity. When the direction of flow alters, the signal is reversed 180° in phase. An A. C. amplifier is used so that contact potentials do not influence the measurement. When the amplifier has a high input resistance no special measures against polarization are necessary. The A. C. amplifier can be made more constant by known means (negative feedback and/or stabilization of the supply-voltage). The signal being proportional to the magnetic field strength and therefore to the supply-voltage of the magnet, said supply voltage must be stabilized or the amplification must be dependent from the supply voltage of the magnet to compensate said voltage-variations, for example, as disclosed in our copending application, Serial Number 351,278, filed April 27, 1953. The amplified A. C. signal is fed to a suitable indicator. When such an indicator is insensitive to the phase of the signal and only responds to the magnitude of the signal a liquid stream, continuously reversing its direction will be indicated as a quantity or velocity of flowing liquid, though the resulting flow can be zero, e. g. in the case of vibrations in a stagnant liquid.

This difficulty can be removed by using a phase-sensitive detector as indicator. When using an A. C. magnet the connection with the electrodes must be carried out in such a way that the electrode-circuit does not embrace a net effective magnetic field as otherwise in said circuit a spurious signal would occur as a consequence of transformer action.

By carefully carrying out said connections, e. g. by twisting or by providing correction loops or by compensating for said spurious signal said disturbance transformer action can be removed. When using a phase-sensitive detector it is not necessary to carry out said interference eliminations completely. The spurious signal differs in phase about 90° in respect to the flow signal so that the phase-sensitive detector when correctly adjusted will be insensitive to the spurious signals.

The invention will now be described with reference to the drawings.

Figure 1:
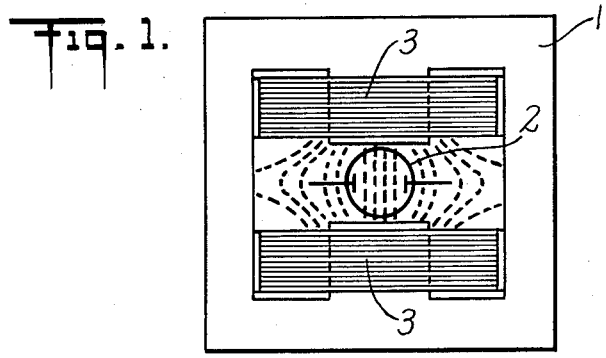
Fig. 1 is a diagrammatical cross-section of a known detector.

In the construction of a detector for small tube diameters the magnet in most cases is provided with a shell-type core 1. The air-gap in which the tube 2 is provided, is arranged in the central leg of the core. The magnet coils 3 are arranged on said leg above and beneath the air gap (Fig. 1). Said magnet type produces a fairly homogeneous field in the central region of the air-gap and shows a leakage which is not too large, but more remote from the central part the field is not at all homogeneous.

The dimensions of the magnet however, are large in respect to the diameter of the tube, when a magnetic field of some strength (1000–2000 Gauss) must be generated and when the magnet has such a ratio of $\omega L/R$ that the variation of the ohmic resistance has no influence on the field when the temperature varies. In most cases the tube 2 is made of glass, ceramic or other insulating material, dependent on the desired chemical stability. One of the usual pair of sensing electrodes is shown at 10 arranged for contact with the liquid passing by; the other sensing electrode (not shown) contacts the liquid in a region diametrically opposite from the electrode 10. On the outer wall of the tube 2 a conducting layer 4 (Fig. 2) is provided to produce an electrostatic screening of the liquid to exclude electrical disturbances originating in the surroundings. This is of special importance when liquids with a low conductance must be dealt with. To prevent stray electric currents from passing along the liquid and generating an undesired signal at the electrodes it will be useful to arrange a further electrode or electrodes 5 in that part of the tube which is electrostatically screened, before and behind the magnetic field. At both sides the further electrode 5 and the screen 4 are electrically connected with each other, said connection eventually being grounded. The best results are obtained with annular electrodes.

It is also possible to use non-magnetic tubes of an electrical conductive material, when the tube at the inner wall is electrically insulated with respect to the liquid over the width of the magnetic field to prevent a short-circuit of the generated induction-potential.

The non-insulated parts of the tube in this case form the further electrodes mentioned above. However in the screen or in the conducting tube eddy currents will be generated. By using a material of high specific resistance e. g. stainless steel, the heating caused by the eddy currents can be strongly reduced.

The influence of eddy currents on the magnitude and the phase of the magnetic field is small in so far as small tube-diameters are used.

When constructing a detector for large tube-diameters (1½ inches and more) it is desirable to design the detector in such a way, that said detector bears on the pipe line without further support. In this self-supporting construction it is desirable to keep as small as possible the weight and the moment of inertia of the magnet.

For large tube diameters a shell type magnet is difficult. The magnetic yield is unfavourable as a consequence of the leakage and of the feature that only a part of the field is found in the air gap in the inner space of the tube.

In the case of larger tube diameters the influence on the field of eddy currents in the screen or in the conducting tube may be inadmissible.

It is known that the phase of the eddy currents in respect with the embraced field is defined by the ratio $\omega L/R$ of the eddy current circuit. When the plane or surface area in which the eddy-currents occur is enlarged said ratio is increased and the phase-shift between the currents and the embraced field increases.

When the coupling factor between the original field and the field of the eddy currents becomes noticeably smaller than unity a phase shift will occur between the main field and the field of the eddy currents.

The magnitude of said phase shift and that of the resulting embraced field are dependent on the value of $\omega L/R$ of the eddy-current circuit. When the value of $\omega L/R$ varies with temperature, also the phase and the magnitude of the field in the region of the eddy-currents will vary. This results in an inadmissible temperature sensitivity when a shell type magnet is used for tubes with large diameter.

Apart from the above mentioned temperature-influences, in mass-production a random characteristic or effect of the phase and the magnitude of the field is inadmissible. In such a case the detector and the amplifier must be constructed in such a way that both can be interchanged.

For this reason the detectors must generate a signal of the same phase and magnitude for the same liquid velocities independent of the construction of the liquid-tube, as phase-differences will result in larger measuring-errors especially when using a phase-sensitive indicator.

The arrangement according to the invention results in a magnet construction showing a compact iron-circuit at a comparative large air gap and having a small moment of inertia with respect to the tube. Besides the field embraced by the eddy-currents has a coupling factor with respect to the main field, which approximates the value $K=1$. As a consequence of said high coupling-factor the influence of the eddy-currents on the field inside the tube can be neglected and the magnitude of the admissible eddy currents is exclusively determined by the admissible heating of the screening or the tube.

Figure 2:
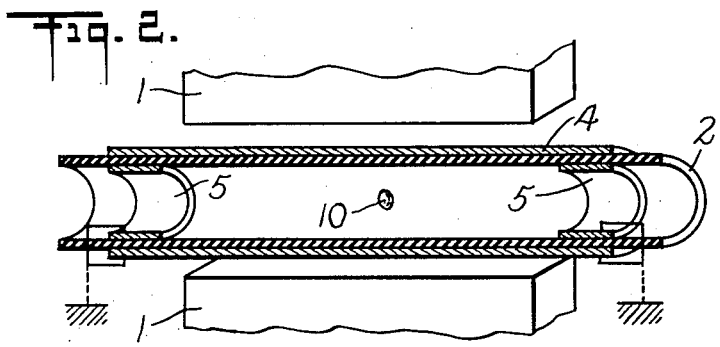
Fig. 2 is a schematical section for the explanation of some phenomena.

In this it is possible to impart the necessary strength to the tubes and to use tubes of e. g. stainless steel or in general of a non-magnetic metal, said tube being provided with an internal coating dependent on the desired chemical properties, said coating at the same time providing the electric insulation of the tube. When the whole tube is coated grounding electrodes upstream and downstream of the magnet must be provided (Fig. 2).

When the tube consists of another material it is possible to provide a further non-magnetic steel tube around the liquid tube for reinforcing the construction said further tube also forming the screening.

Figure 3:
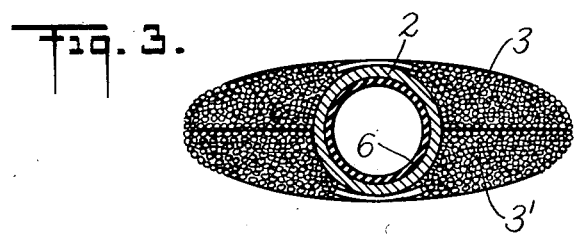
Figures 3 and 5 are cross sections of embodiments of the device according to the invention in which the electrodes are not indicated.
Figure 4:
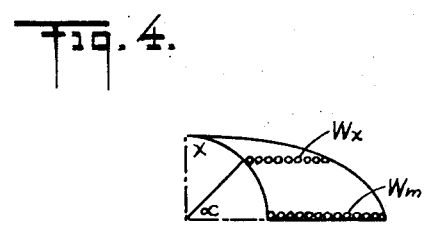
Fig. 4 is a diagram, for purposes of explanation.

The detector according to the invention (Fig. 3) consists of a tube, 2 surrounded by coils 3, 3', the number of turns of said coils along the circumference of the tube being a function of the covered arc, measured from the abscissa or horizontal reference line through the center of the tube (Fig. 4). The number of turns in an arbitrary plane $x$ is $W_x = \cos \alpha W_m$ (in which $W_m$ is the number of turns on the abscissa). Said winding is divided over the abscissa and consists of two coils 3, 3'. Together they are limited at the inner side by a circle and at the outer side by an ellipse (Fig. 3).

Figure 5:
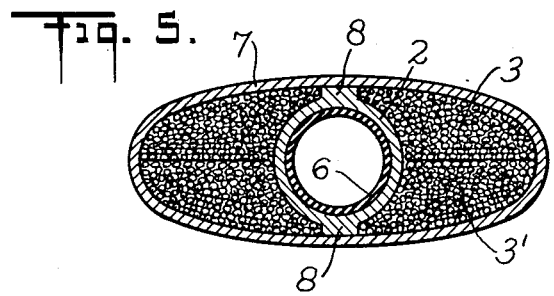

The tube 2 in this case is a metal tube and in the magnetic field the tube is provided with an internal coating 6. To facilitate a self-supporting structure the coil is not wholly wound according to the cosinus function as mentioned above, but in the central part where the circle and the ellipse are tangent, a part is omitted (Fig. 5).

The field disturbance occurring at the place can be removed by the provision of an iron circuit 7 (Fig. 5) the inner surface of which forms an ellipse, the shape of the outer surface not being critical. Said opening in the coil gives the opportunity to centre and to fasten the coils 3, 3', and the iron shell 7 on the tube 2 e. g. by means of ridges 8 on the tube 2. The coils 3, 3' are wound around said ridges and the shell 7 can be fastened to the ridges 8 by means of screws.

Figure 6:
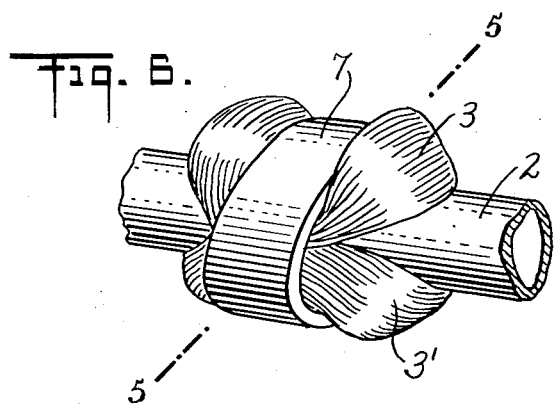
Fig. 6 is a perspective view of one embodiment of the invention.
Figure 7:
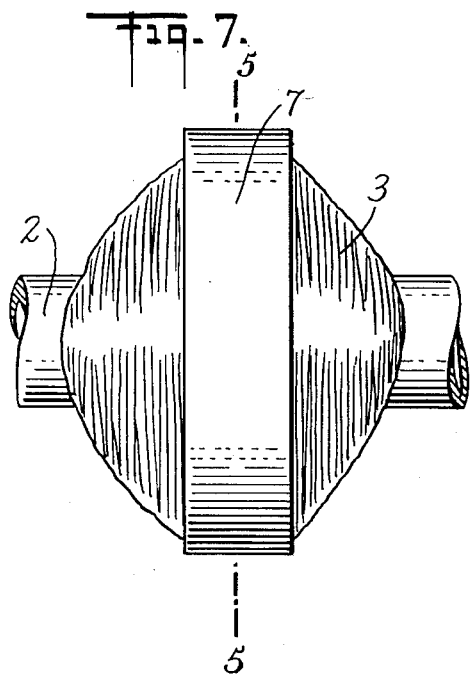
Fig. 7 is a plan view of the embodiment shown in Fig. 6.
Figure 8:
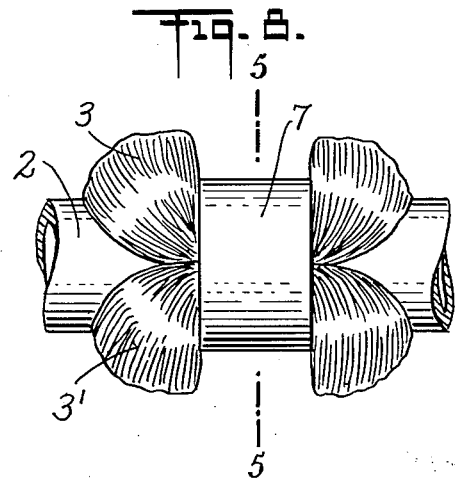
Fig. 8 is a side elevation of the embodiment shown in Fig. 6.

The overall arrangement of the detector, described above with reference to Figures 3 through 5, is best shown in the perspective view of Figure 6, considered together with the plan view of Figure 7 and the side elevation view of Figure 8. These views show the upper and lower coils 3 and 3' positioned about the fluid carrying tube 2 with the permeable member 7 closely fitted over the coils to produce a cohesive and tightly coupled unit. These views also show the manner in which those portions of the coils which run generally transversely to the axis of the tube 2 are formed so as to produce a somewhat saddle shaped coil configuration, both above and below the fluid carrying tube.

We claim:

In a detector for an induction fluid flow meter adapted to measure the flow of a conductive fluid, the combination of a pipe for carrying said fluid, magnetic field generating structure positioned exteriorly of said pipe to produce alternating magnetic flux transversely across said pipe, a pair of contact electrodes positioned within said pipe on a line transverse to the direction of said magnetic flux to pick up electrical signals generated in said fluid in response to the movement of said fluid through said magnetic field, said pipe being formed on an electrically-conductive, non-magnetic material and having a layer of insulating material adjacent the inner surface throughout the entire length of said pipe to prevent the short-circuiting of said generated electrical signals, a first annular-shaped fluid-contacting element formed of electrically-conductive material positioned wholly interiorly of said pipe adjacent one end thereof and arranged to encircle and make contact with the fluid passing through said one end, a first portion of said insulating material being disposed between said first element and said pipe, a first electrical connection arranged to establish low-resistance electrical contact between said first element and said one pipe end, a second annular-shaped fluid-contacting element formed of electrically-conductive material positioned wholly interiorly of said pipe adjacent the other end thereof and arranged to encircle and make contact with the fluid passing through said other end, a second portion of said insulating material being disposed between said second element and said pipe, a second electrical connection wholly distinct from said first connection and arranged to establish low-resistance electrical contact between said second element and said other pipe end, said fluid-contacting elements, said electrical connections and said pipe conjointly forming a low-resistance series-connected electrical path bridging said layer of insulating material to by-pass stray electrical currents flowing in said fluid around and away from said contact electrodes, said pipe also thereby being maintained at the average potential of said fluid so as to assure good electrostatic shielding from the effects of potential variations on said field generating structure.

References Cited in the file of this patent

UNITED STATES PATENTS

| | | |
|---|---|---|
| 2,395,736 | Grundmann | Feb. 26, 1946 |
| 2,435,043 | Lehde | Jan. 22, 1948 |
| 2,583,724 | Broding | Jan. 29, 1952 |
| 2,685,796 | Romanowski et al. | Aug. 10, 1954 |
| 2,696,737 | Mittelmann | Dec. 14, 1954 |

OTHER REFERENCES

An Electromagnetic Flowmeter for Transient Flow Studies, in Review of Scientific Instruments, vol. 22, No. 1, January 1951, by Jas. S. Arnold, pp. 43–47.